United States Patent
Bagreev et al.

(10) Patent No.: US 10,808,076 B2
(45) Date of Patent: Oct. 20, 2020

(54) PURIFICATION OF CRUDE POLYALKYLENE OXIDE POLYMERS WITH ACID FUNCTIONALIZED SILICAS AND METAL SILICATES

(71) Applicants: Andrey Bagreev, Chesterfield, VA (US); George E. Hicks, Elizabeth, IN (US)

(72) Inventors: Andrey Bagreev, Chesterfield, VA (US); George E. Hicks, Elizabeth, IN (US)

(73) Assignee: The Dallas Group of America, Inc., Whitehouse, NJ (US)

( * ) Notice: Subject to any disclaimer, the term of this patent is extended or adjusted under 35 U.S.C. 154(b) by 210 days.

(21) Appl. No.: 15/919,770

(22) Filed: Mar. 13, 2018

(65) Prior Publication Data
US 2018/0273682 A1 Sep. 27, 2018

Related U.S. Application Data

(60) Provisional application No. 62/475,458, filed on Mar. 23, 2017, provisional application No. 62/557,370, filed on Sep. 12, 2017.

(51) Int. Cl.
| | |
|---|---|
| *C08G 65/30* | (2006.01) |
| *C08G 65/26* | (2006.01) |
| *B01J 20/28* | (2006.01) |
| *B01J 20/10* | (2006.01) |

(Continued)

(52) U.S. Cl.
CPC .............. *C08G 65/30* (2013.01); *B01J 20/10* (2013.01); *B01J 20/22* (2013.01); *B01J 20/28004* (2013.01); *B01J 20/28011* (2013.01); *B01J 20/28059* (2013.01); *B01J 20/28061* (2013.01); *B01J 20/28064* (2013.01); *B01J 20/28069* (2013.01); *B01J 20/3085* (2013.01); *C08G 65/2609* (2013.01); *C08G 65/2648* (2013.01)

(58) Field of Classification Search
CPC ...... B01J 20/10; B01J 20/22; B01J 20/28004; B01J 20/28011; B01J 20/28059; B01J 20/28061; B01J 20/28064; B01J 20/28069; B01J 20/3085; C08G 65/2609; C08G 65/2648; C08G 65/30
See application file for complete search history.

(56) References Cited

U.S. PATENT DOCUMENTS

| | | |
|---|---|---|
| 2,451,564 A | 10/1948 | La Lande |
| 2,498,353 A | 2/1950 | Bierce |
| 3,528,920 A | 9/1970 | Niizeki et al. |

(Continued)

FOREIGN PATENT DOCUMENTS

| | | |
|---|---|---|
| GB | 877269 | 9/1961 |
| WO | WO2008/059530 | 5/2008 |

*Primary Examiner* — Frances Tischler
(74) *Attorney, Agent, or Firm* — Raymond J. Lillie (57) ABSTRACT

A method of purifying a crude polyalkylene oxide polymer that contains a catalyst, such as potassium hydroxide. The method comprises contacting the crude polyalkylene oxide polymer with a composition comprising an acid functionalized silicate, such as an acid functionalized magnesium silicate adsorbent containing at least one acid in an amount effective to remove the catalyst from the polyalkylene oxide polymer. Such a method provides for an improved removal of the catalyst from the polyalkylene oxide polymer.

47 Claims, 4 Drawing Sheets

(51) Int. Cl.
*B01J 20/22* (2006.01)
*B01J 20/30* (2006.01)

(56) References Cited

U.S. PATENT DOCUMENTS

| | | | | |
|---|---|---|---|---|
| 3,755,183 | A | * | 8/1973 | Fahn .................. B01J 20/10 |
| | | | | 252/194 |
| 3,839,226 | A | * | 10/1974 | Yates ................ C01B 33/325 |
| | | | | 502/407 |
| 3,940,498 | A | | 2/1976 | Butterworth et al. |
| 4,029,879 | A | | 6/1977 | Muzzio |
| 4,129,718 | A | | 12/1978 | Muzzio |
| 4,137,398 | A | | 1/1979 | Muzzio |
| 4,254,287 | A | | 3/1981 | Ziegenhain et al. |
| 4,296,000 | A | | 10/1981 | Wason |
| 4,306,943 | A | | 12/1981 | Mori et al. |
| 5,006,356 | A | | 4/1991 | Munson |
| 5,262,562 | A | | 11/1993 | Hollingsworth et al. |
| 5,908,500 | A | | 6/1999 | Brooks et al. |
| 7,247,699 | B2 | | 7/2007 | Takabatake et al. |
| 9,295,810 | B2 | | 3/2016 | Hicks et al. |
| 2004/0192884 | A1 | * | 9/2004 | Takabatake .......... B01D 15/00 |
| | | | | 528/421 |

* cited by examiner

PURIFICATION OF CRUDE POLYALKYLENE OXIDE POLYMERS WITH ACID FUNCTIONALIZED SILICAS AND METAL SILICATES

This application claims priority based on Provisional Application Ser. No. 62/475,458, filed Mar. 23, 2017, and Provisional Application Ser. No. 62/557,370, filed Sep. 12, 2017, the contents of which are incorporated by reference in their entireties.

This invention relates to the purification of crude polyalkylene oxide polymers which contain a catalyst that was employed in producing such crude polyalkylene oxide polymers. More particularly, this invention relates to the purification of a crude polyalkylene oxide polymer by contacting the crude polyalkylene oxide polymer with an acid functionalized silicate, such as an acid functionalized magnesium silicate adsorbent containing at least one acid. The crude polyalkylene oxide polymers is contacted with the acid functionalized silicate, such as an acid functionalized magnesium silicate adsorbent, in an amount effective to remove the catalyst from the crude polyalkylene oxide polymer.

Polyalkylene oxide polymers, also known sometimes as polyethers, and include single alcohol alkoxylates, also known as polyalkylene oxide monols, and polyether polyols. Polyalkylene oxide polymers are formed from alkylene oxide monomers such as ethylene oxide (EO), propylene oxide (PO), and butylene oxide (BO). Such polymers have the following structures.

polyethylene glycol (PEG)/polyethylene oxide (PEO)    polypropylene oxide (PPO)    polybutylene oxide (PBO)

n is a integer which in a non-limiting embodiment is sufficiently large that the above compounds, as a whole, have molecular weights of from about 300 to about 10,000,000.

The polymerization of alkylene oxides such as ethylene oxide, propylene oxide, and butylene oxide is effected by reacting the alkylene oxide with an initiator compound, such as an alcohol, for example. When the initiator has a single OH group or a single alcohol group, the resulting polymer sometimes is referred to as a polyether monol. For example the polymerization of ethylene oxide, as initiated by an alcohol, is shown in the following equation:

(Preferably, n is from 2 to 18.)

ROH is a monol (single OH or single alcohol group) wherein R is a hydrocarbon radical having up to 18 carbon atoms, and when reacted with ethylene oxide, provides an ethoxylated alcohol (or alcohol ethoxylate) with only a single alcohol group at its end. Examples of ethyoxylated monols include non-ionic surfactants such as nonylphenol ethoxylates (NPEs) and fatty alcohol ethoxylates.

These molecules gain their surfactant properties from their hydrophillic ethoxylated section combined with a hydrophobic fatty or "R" section. Fatty acids also can be ethoxylated. U.S. Pat. No. 8,273,925 provides an exhaustive list of fatty alcohols, fatty acids and secondary amines that will result in a ethoxylated alcohol (or alcohol ethoxylates).

Another group of polyalkylene oxide polymers, known as polyether polyols, are generated when the initiator is a diol, triol, or higher. The term "polyol" as used herein, means multiple OH or alcohol groups. The term "polyether", as used herein, means that the final polymer molecule is made via an initiator plus an alkylene oxide such as EO, PO or BO.

When water or a diol is used as the initiator, a diol will be the reaction product. Examples of diols which may be produced are shown in the following equations:

n is an integer large enough that the compounds, as a whole, have molecular weights of from about 300 to about 26,000.

Diols (having 2 OH groups) and triols (having 3 OH groups) are useful for making polyurethane polymers by reacting the multifunctional polyether polyol with a multifunctional isocyanate to create a high molecular weight, highly networked polymer structure.

When a triol such as glycerine is used as the initiator, a triol polyether polyol will be the reaction product. High molecular weight polyether triols generally are used for making flexible polyurethane foam. An example of a triol which may be produced is shown in the following equation:

-continued n is an integer large enough that the compound, as a whole, has a molecular weight of from about 300 to about 26,000.

Other initiators for making polyether polyols are listed below:

| Example Initiator | Initiator Structure |
|---|---|
| Water | |
| Ethylene glycol | |
| 1,2-Propylene glycol | |
| Glycerine | |
| Trimethylolpropane | |
| Ethylene diamine (1,2-diaminoethane) | |
| Pentaerythritol | |
| Diethylene triamine | |
| Sorbitol | |
| Sucrose | |

Other initiators include, but are not limited to higher alcohols, polyalcohols, methyl glycoside, phenols, alkylphenols, bisphenol A, alkylethylene diamines, isopropanolamine, ethanolamine, and polyamines.

Furthermore, alkylene oxides can be mixed to make random or block copolymers, which enhances the cost, morphology, performance and reactivity of the polyether polyol:

R-E-P-E-P-P-E-E-H
R-P-E-E-E-P-P-P-E-P-E-E-P-P-H
R-E-P-E-P-P-E-E-P-P-H

Random EO/PO Polymner $E = -(CH_2-CH_2-O)-$ $P = -(CH_2-CH-O)- \atop \phantom{P = -(CH_2-}CH_3$ n and m are integers large enough that the resulting block copolymers have molecular weights of from about 300 to about 26,000.

The reaction of the alkylene oxide with the initiator usually takes place in the presence of a catalyst. The catalyst may be a basic catalyst, such as an alkali metal hydroxide or an alkali metal alkoxide. Such catalysts include, but are not limited to, potassium hydroxide (KOH), sodium hydroxide (NaOH), sodium methoxide, sodium alkoxides, potassium alkoxides, hydroxides and alkoxides of lithium, rubidium, or cesium, strontium, or barium, potassium, potassium carbonate, and sodium carbonate. In general, the catalyst may be present in an amount of from about 0.01 wt. % to about 1.0 wt. % (i.e., from about 100 to about 10,000 ppm), and preferably from about 0.17 wt. % to about 0.40 wt. % (i.e., from about 1,700 ppm to about 4,000 ppm).

Polyether polyols, as mentioned hereinabove, are used commonly in the production of urethane polymers. In particular, polyether polyols are reacted with polyisocyanate in the presence of an added catalyst and other materials to produce urethane polymers which may be in the form of rubber-like elastomers, flexible or rigid foam, and the like; however, the hereinabove described process for making polyether polyols provides a crude polyol containing impurities that include one or more of the above-mentioned catalysts.

In order that urethane polymers having desired properties and characteristics be produced, it is important that the polyether polyols that are reacted with the polyisocyanate are essentially free of impurities which may function as undesirable catalysts or otherwise in the urethane polymer reaction. More particularly, prior to reacting the polyether polyols with polyisocyanate, the concentration of the catalyst employed in producing the polyether polyols should be reduced to less than 0.001% (i.e., less than 10 ppm).

Various attempts have been made to purify the crude polyether polyols by removing the alkaline catalyst and other impurities therefrom. These attempts include, for example, neutralization with acid (see, for example U.S. Pat. No. 4,306,943) and removal of the resulting salts, selective adsorption of alkaline catalysts, removal of alkaline catalysts by ion-exchange techniques, and the like. Adsorption of alkaline catalysts by synthetic magnesium silicate is one of the most effective methods for the purification of crude polyether polyols. (See, for example, U.S. Pat. Nos. 4,029,879; 4,129,718; 4,306,943; and 7,247,699.)

Combinations of the above-mentioned treatments also have been employed. For example, U.S. Pat. No. 4,306,943 discloses adding an acid to a crude polyether polyol in order to neutralize the catalyst, followed by contacting the crude polyether polyol with a magnesium silicate adsorbent.

The present invention is directed to an improved and more efficient method of purifying crude polyalkylene oxide polymers containing an alkaline catalyst.

In accordance with an aspect of the present invention, there is provided a method of purifying a crude polyalkylene oxide polymer. The crude polyalkylene oxide polymer contains a catalyst. The method comprises contacting a crude polyalkylene oxide polymer with a composition comprising an acid functionalized silicate adsorbent containing at least one acid. The crude polyalkylene oxide polymer is contacted with the composition in an amount effective to remove the catalyst from the crude polyalkylene oxide polymer.

Acid functionalized silicates containing at least one acid which may employed in accordance with the present invention include, but are not limited to, acid functionalized metal silicates, such as, but not limited to, acid functionalized magnesium silicate, acid functionalized calcium silicate, and acid functionalized aluminum silicate, as well as acid functionalized silica gels. In a non-limiting embodiment, the acid functionalized silicate is an acid functionalized metal silicate. In another non-limiting embodiment, the acid functionalized metal silicate is an acid functionalized magnesium silicate.

Magnesium silicate is a compound containing magnesium oxide (MgO) and silicon dioxide ($SiO_2$), and may be hydrated. Magnesium silicate may have the formula $MgO \cdot x SiO_2 \cdot mH_2O$, wherein x is the molar ratio of $SiO_2$ to MgO, and m is the number of moles of chemically bound water.

Synthetic magnesium silicate is manufactured by effecting a precipitation reaction between a soluble magnesium salt, such as, for example, magnesium sulfate ($MgSO_4$), magnesium chloride ($MgCl_2$), or magnesium nitrate ($Mg(NO_3)_2$), and a metal silicate, such as, for example, sodium silicate.

In general, the magnesium salt and the metal silicate are reacted in an aqueous solution to produce a slurry of magnesium silicate, which may be a hydrated magnesium silicate, suspended in an aqueous solution. The slurry then is filtered, and the collected magnesium silicate is washed, dried, and classified for particle size. Examples of such synthetic magnesium silicates which may be employed are described in U.S. Pat. Nos. 4,681,768; 5,006,356; 5,597,600; 7,635,398; and 9,295,810.

The magnesium silicate then is contacted with at least one acid, whereby some of the basic groups and/or magnesium-containing groups are converted to acidic groups, thereby providing the acid functionalized, or acid grafted magnesium silicate.

Although the scope of the present invention is not to be limited to any theoretical reasoning, magnesium silicate includes two main types of chemically active sites on the surface, i.e., silanol groups ($\equiv Si-OH$), which are acidic, and magnesil groups ($\equiv Si-O-Mg\, OH$), which are basic. When the magnesium silicate is contacted with the acid, some of the basic magnesil groups and other magnesium groups are converted to surface acidic groups. These acid functionalized groups, along with the silanol groups, then can work as active sites for the removal of catalyst from the crude polyalkylene oxide polymer. This is applicable especially to the treatment of crude polyalkylene oxide polymers containing an alkali catalyst and/or other alkali materials.

In a non-limiting embodiment, the at least one acid is at least one polyprotic acid. In another non-limiting embodiment, the at least one polyprotic acid is selected from the group consisting of sulfuric acid ($H_2SO_4$), $H_2SO_3$, $H_2S_2O_3$, phosphoric acid ($H_3PO_4$), $H_4P_2O_7$, $H_2PO_2$, $H_3PO_3$, $H_2CO_3$, and mixtures thereof.

In a non-limiting embodiment, the at least one polyprotic acid is sulfuric acid. In another non-limiting embodiment, the at least one polyprotic acid is phosphoric acid.

In a non-limiting embodiment, the at least one acid is present in the acid functionalized silicate, such as an acid functionalized magnesium silicate, in an amount of from about 0.2 wt. % to about 40 wt. %. In another non-limiting embodiment, the at least one acid is present in the acid functionalized silicate, such as an acid functionalized magnesium silicate, in an amount of from about 0.2 wt. % to about 25 wt. %. In another non-limiting embodiment, the at least one acid is present in the acid functionalized silicate, such as an acid functionalized magnesium silicate, in an amount of from about 1 wt. % to about 15 wt. %.

In a non-limiting embodiment, the acid functionalized magnesium silicate has a molar ratio of MgO to $SiO_2$ of from about 1:1.0 to about 1:4.0. In another non-limiting embodiment, the acid functionalized magnesium silicate has a molar ratio of MgO to $SiO_2$ of from about 1:1.4 to about 1:4.0. In yet another non-limiting embodiment, the acid functionalized magnesium silicate has a molar ratio of MgO to $SiO_2$ of from about 1:2.5 to about 1:3.6.

In a non-limiting embodiment, the acid functionalized magnesium silicate has a pH in a 5% slurry of from about 3.0 to about 10.8. In another non-limiting embodiment, the acid functionalized magnesium silicate has a pH in a 5% slurry of from about 7.5 to about 10.5. In yet another non-limiting embodiment, the acid functionalized magnesium silicate has a pH in a 5% slurry of from about 8.0 to about 10.5.

In a non-limiting embodiment, when the acid functionalized magnesium silicate is a sulfuric acid functionalized magnesium silicate, the sulfuric acid functionalized magnesium silicate has a pH in a 5% slurry of from about 8.0 to about 9.7, and a molar ratio of MgO to $SiO_2$ of from about 2.5 to about 2.8. In another non-limiting embodiment, the sulfuric acid functionalized magnesium silicate has a pH in a 5% slurry of from about 8.0 to about 10.5, and a molar ratio of MgO to $SiO_2$ of from about 3.2 to about 3.6.

In a non-limiting embodiment, the acid functionalized magnesium silicate has a conductance in a 1.0% slurry of from about 0.2 millisiemens (mS)/cm to about 5.0 mS/cm. In another non-limiting embodiment, when the functionalized magnesium silicate is a sulfuric acid functionalized magnesium silicate, the sulfuric acid functionalized magnesium silicate has a conductance in a 1.0% slurry of from about 0.2 mS/cm to about 2.6 mS/cm. In yet another non-limiting embodiment, when the acid functionalized magnesium silicate is a phosphoric acid functionalized magnesium silicate, the phosphoric acid functionalized magnesium silicate has a conductance in a 1.0% slurry of from about 0.2 mS/cm to about 1.5 mS/cm.

In a non-limiting embodiment, the acid functionalized magnesium silicate has a loss on ignition of from about 10.0% to about 15.0%.

In a non-limiting embodiment, the acid functionalized magnesium silicate has a surface area of at least 30 square meters per gram. In another non-limiting embodiment, the acid functionalized magnesium silicate has a surface area of from about 50 square meters per gram. In yet another non-limiting embodiment, the acid functionalized magnesium silicate has a surface area of from about 50 square meters per gram to about 700 square meters per gram.

In a non-limiting embodiment, the acid functionalized magnesium silicate has a total pore volume of at least 0.1 ml per gram. In another non-limiting embodiment, the acid functionalized magnesium silicate has a total pore volume of from about 0.1 ml per gram to about 1.2 ml per gram.

In a non-limiting embodiment, the acid functionalized magnesium silicate has a mean particle size of from about 10 microns to about 1,000 microns. In another non-limiting embodiment, the acid functionalized magnesium silicate has a mean particle size of from about 10 microns to about 500 microns. In another non-limiting embodiment, the acid functionalized magnesium silicate has a mean particle size of from about 10 microns to about 250 microns. In another non-limiting embodiment, the acid functionalized magnesium silicate has a mean particle size of from about 10 microns to about 175 microns. In yet another non-limiting embodiment, the acid functionalized magnesium silicate has a mean particle size of from about 10 microns to about 125 microns. In a further non-limiting embodiment, the acid functionalized magnesium silicate has a mean particle size of from about 30 microns to about 100 microns.

In a non-limiting embodiment, the acid functionalized magnesium silicate has a bulk density of from 0.2 g/cc to about 0.8 g/cc.

In a non-limiting embodiment, the crude polyol is contacted with the acid functionalized silicate, such as an acid functionalized magnesium silicate, in an amount of from about 0.1 wt. % to about 3.0 wt. %, based on the weight of the polyalkylene oxide polymer. In another non-limiting embodiment, the crude polyol is contacted with the acid functionalized silicate, such as an acid functionalized magnesium silicate, in an amount of from about 0.5 wt. % to about 3.0 wt. %, based on the weight of the polyalkylene oxide polymer.

Catalysts which may be contained in the crude polyalkylene oxide polymer, and which are removed by contacting the crude polyol with the acid functionalized silicate, such as an acid functionalized magnesium silicate, include, but are not limited to, alkali catalysts, as well as $Al(OR)_3$, $Zn(OR)_2$, $Ti(OR)_4$, wherein R is an alkyl group or an alcohol, and double metal cyanide (DMC) catalysts having the formula $Zn_3[Co(CN)_6]_2$. In a non-limiting embodiment, the catalyst is an alkali catalyst. In another non-limiting embodiment, the alkali catalyst is selected from the group consisting of potassium hydroxide (KOH), sodium hydroxide (NaOH), sodium methoxide, sodium alkoxides, potassium alkoxides, hydroxides and alkoxides of lithium, rubidium, cesium, strontium, or barium, potassium, potassium carbonate, and sodium carbonate. In yet another non-limiting embodiment, the catalyst is an alkali hydroxide. In a further non-limiting embodiment, the alkali hydroxide is potassium hydroxide.

Although the scope of the present invention is not intended to be limited to any theoretical reasoning, it is believed that, when the crude polyalkylene oxide polymer contains an alkali catalyst, the catalyst is removed from the crude polyalkylene oxide polymer mainly by a surface chemical reaction with silanol groups that is similar to an ion exchange reaction. Additional alkali catalyst also is removed by the acid functionalized metal groups, such as acid functionalized magnesium groups.

In another non-limiting embodiment, subsequent to contacting the crude polyalkylene oxide polymer with the acid functionalized silicate, such as an acid functionalized magnesium silicate, the crude polyalkylene oxide polymer is contacted with a liquid comprising water. Although the scope of the present invention is not to be limited thereby, it is believed that the addition of water promotes and accelerates removal of the catalyst from the crude polyalkylene oxide polymer, and activates the acid functionalized groups on the surface of the acid functionalized silicate adsorbent, such as an acid functionalized magnesium silicate adsorbent. In a non-limiting embodiment, the crude polyalkylene oxide polymer is contacted with a liquid comprising water in an amount of from about 0.5 wt. % to about 4.0 wt. %, based on the weight of the crude polyalkylene oxide polymer.

In another non-limiting embodiment, the liquid comprising water further comprises at least one alcohol. In further non-limiting embodiment, the at least one alcohol is selected from the group consisting of methanol, ethanol, propanol, isopropanol, and mixtures thereof.

In yet another non-limiting embodiment, subsequent to contacting the crude polyalkylene oxide polymer with the acid functionalized silicate, such as an acid functionalized magnesium silicate, the crude polyalkylene oxide polymer is contacted with at least one alcohol. The at least one alcohol may be selected from those hereinabove described. In a non-limiting embodiment, the crude polyalkylene oxide polymer is contacted with the at least one alcohol in an amount of from about 0.5 wt. % to about 4.0 wt. %, based on the weight of the crude polyalkylene oxide polymer.

BRIEF DESCRIPTION OF THE DRAWINGS

The invention now will be described with respect to the drawings, wherein.

EXAMPLES

The invention now will be described with respect to the following examples. It is to be understood, however, that the scope of the present invention is not intended to be limited thereby.

Example 1

Magnesium Silicate Production

Synthetic magnesium silicate was produced by a precipitation reaction between concentrated sodium silicate, magnesium sulfate (10% wt.) and water in a continuous process. The three reagents were dosed in a large reactor where the following precipitation reaction takes place. In the reaction equation below, x=2.5, and m=0.78.

$Na_2Ox*SiO_2+MgSO_4+H_2O \rightarrow MgOx*SiO_2.mH_2O+Na_2SO_4$

It was found that when a molar excess of magnesium sulfate was kept between 5 and 30% of the stoichiometric amount, the precipitation reaction was completed much faster and the final product has less sodium impurities. The reaction temperature usually was kept between 20° and 60° C., pH was 8.5, and the solids content was varied from 5 to 20% wt., depending upon water addition. After the precipitation reaction, the magnesium silicate slurry was washed with water, and concentrated by filtration.

Preparation of Magnesium Silicate Samples with Activated Magnesium Containing Groups A magnesium silicate concentrated slurry was used for acid functionalization of magnesium containing groups. A magnesium silicate slurry was prepared by a precipitation reaction and had a mole ratio equal to 2.5 ($MR=SiO_2/MgO$). The slurry was water washed. The initial pH of the concentrated slurry was 9.9 and the conductance was equal to 3.2 mS/cm.

200 g of concentrated slurry were added to a stainless vessel and heated at 45° C. under sufficient agitation. A concentrated $H_2SO_4$ solution (from 1 to 15% wt. based on the weight of dry sample) then was added directly to the slurry and agitated for 15 min. The acid treated slurry was dried at 105° C. in an oven overnight. Then the dried material was milled and found to have particle sizes from 53 to 212 urn. The magnesium silicate samples modified with sulfuric acid were designated the with letter S #, where # is the sample example. An unmodified sample (S0) was prepared the same way, except without any acid addition. The sulfuric acid contents in the modified samples were measured according to the gravimetric method and conductance method (express method), preliminary calibrated with a known amount of sulfate in magnesium silicate.

Data on the pH of 5% powder suspension, conductivity, and % LOI (loss of ignition) are shown in Table 1. A higher percentage of acid addition correlates to a higher conductance in a 1.0% adsorbent slurry in deionized (DI) water. Conductance data demonstrated that all sulfuric acid was functionalized on magnesium silicate and a minimal loss was observed after drying. A higher percentage of acid addition correlates to a lower pH of the adsorbent. Synthetic magnesium silicate, due to the presence of magnesil basic groups, has a buffering capacity for acids and the pH is lowered when the amount of acid dose is increased.

TABLE 1

Chemical properties of oven dried samples modified with sulfuric acid

| Sample | % Acid addition | pH | Conductance, mS/cm | LOI, % |
|---|---|---|---|---|
| S0 | 0 | 9.7 | 0.32 | 13.8 |
| S1 | 1.1 | 9.14 | 0.34 | 10.7 |
| S2 | 2.2 | 8.68 | 0.53 | 10.5 |
| S3 | 3.0 | 8.51 | 0.64 | 10.9 |
| S4 | 5.0 | 8.39 | 0.88 | 11.0 |
| S5 | 6.6 | 8.26 | 1.33 | 12.3 |
| S6 | 9.8 | 8.15 | 1.94 | 13.2 |
| S7 | 15.6 | 8.03 | 2.63 | 13.0 |

The porous structures of the samples of magnesium silicate modified with sulfuric acid were analyzed by a standard nitrogen adsorption method at −193° C. using an ASAP 2020 instrument (Micromeritics, Inc). Surface area was determinated by BET method ($A_{BET}$). Total Pore Volume ($V_{tot}$) was calculated from the last point of adsorption isotherm at P/Po=0.99. Average Pore Diameter was calculated by the formula $$D_{pore}=4V_{tot}/A_{BET}.$$

The parameters of the porous structures of oven dried samples of magnesium silicate modified with sulfuric acid are shown in Table 2. Acid functionalization of magnesium silicate resulted in a significant increase in the surface area at low acid dose, while at high acid doses this effect was not significant. Total pore volume was reduced gradually after acid treatment. All these changes resulted in the formation of new small pores, which is reflected in an average pore diameter reduction.

TABLE 2

Parameters of porous structure of oven dried samples modified with sulfuric acid

| Sample | BET Surface Area, m²/g | Total Pore Volume, cc/g | Average Pore diameter, Å |
|---|---|---|---|
| S0 | 265 | 0.506 | 76 |
| S3 | 507 | 0.495 | 39 |
| S4 | 453 | 0.501 | 44 |
| S5 | 469 | 0.457 | 39 |
| S6 | 391 | 0.403 | 41 |
| S7 | 300 | 0.365 | 49 |

Example 2

KOH Adsorption Test

The potassium hydroxide (KOH) adsorption capacities of the adsorbents prepared in Example 1 were determined in a special test utilizing a low molecular weight polyether polyol (dipropylene glycol—DPG) containing 3000 ppm (3.0 mg KOH/g polyol) of potassium hydroxide as catalyst. A 3-neck flask was fitted with an agitator and thermometer. 200 grams of DPG containing 3000 ppm KOH were added to the 3-neck flask. The DPG solution was heated to 95 degrees Celsius under the required agitation. In order to avoid polyol oxidative degradation, a nitrogen blanket was used by purging nitrogen over polyol treatment. The polyol solution was heated to 95 degrees Celsius and then 2 grams of adsorbent (dose % equal to 1% wt.) were added. The adsorbent/polyol mixture was heated and agitated for 40 minutes and then filtered immediately under 25 inches of vacuum into a 5 centimeter diameter Buchner funnel using a Whatman #1 filter paper. The filtrate was analyzed for residual KOH by titration with 0.02 N HCl and/or by atomic absorption (AA) method.

Residual KOH concentration ($C_{res}$) was calculated from the titration data by the formula:

$$C_{res}(mg/gpolyol)=Vtitr.\times NHCl\times 56.1/Wt.\ filtrate,$$

Where Vtitr. is the volume of used titrant (mL of HCl), N is the normality of the titrant (0.02N) and Wt. filtrate—is the weight of filtrated polyol sample (g).

Adsorptivity or KOH adsorption capacity of adsorbent was calculated from:

$$\text{Adsorptivity } (mg\ KOH/g\ ads)=200\times(C_{in}-C_{res})/Wt._{ads},$$

Where $C_{in}$ and $C_{res}$ are the initial and residual concentrations of KOH in polyol, $Wt._{ads}$ is the adsorbent weight, g. Adsorbent dose % is equal to $$\text{Dose }\%=Wt._{ads}/Wt._{polyol}\times 100.$$

Distribution Constant ($K_D$) was calculated by:

$$K_D=\text{Adsorptivity}/C_{res}$$

KOH Adsorptivity is the parameter of the adsorbent KOH adsorption capacity, the higher the adsorptivity the better the adsorbent, which means that less adsorbent is required to achieve the same residual KOH concentration. Distribution Constant shows the ratio of KOH present in the adsorbent phase to KOH present in the polyol phase, the higher the $K_D$, the more effective the adsorbent.

In a modified customer application, 4 grams of deionized (DI) water (water dose=2%) were added to the polyol before adsorbent dosing. Then treatment was continued according to the procedure described above.

Figure 1:
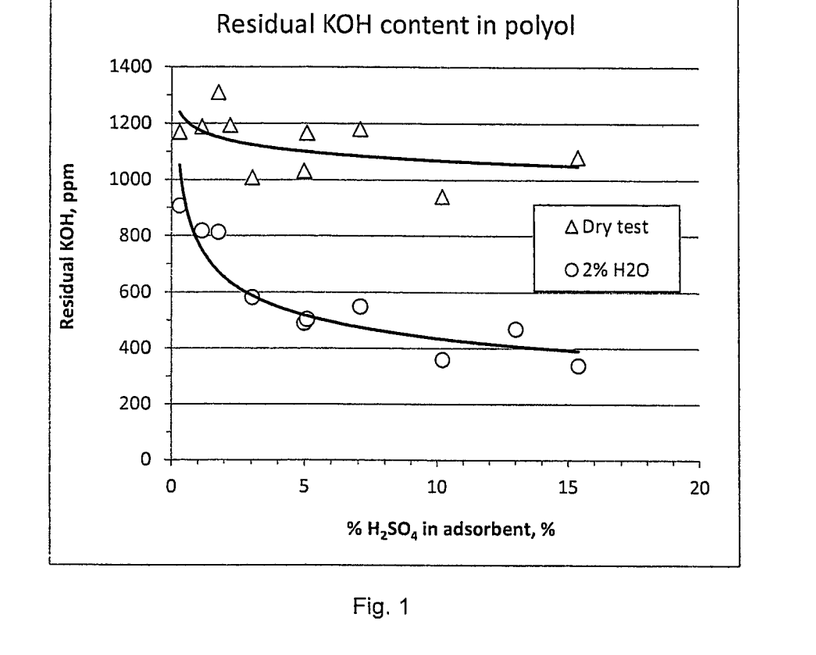
FIG. 1 is a graph showing residual potassium hydroxide (KOH) concentration (in ppm) in polyols treated with sulfuric acid functionalized magnesium silicate, either alone or in combination with 2 wt. % water addition.
Figure 2:
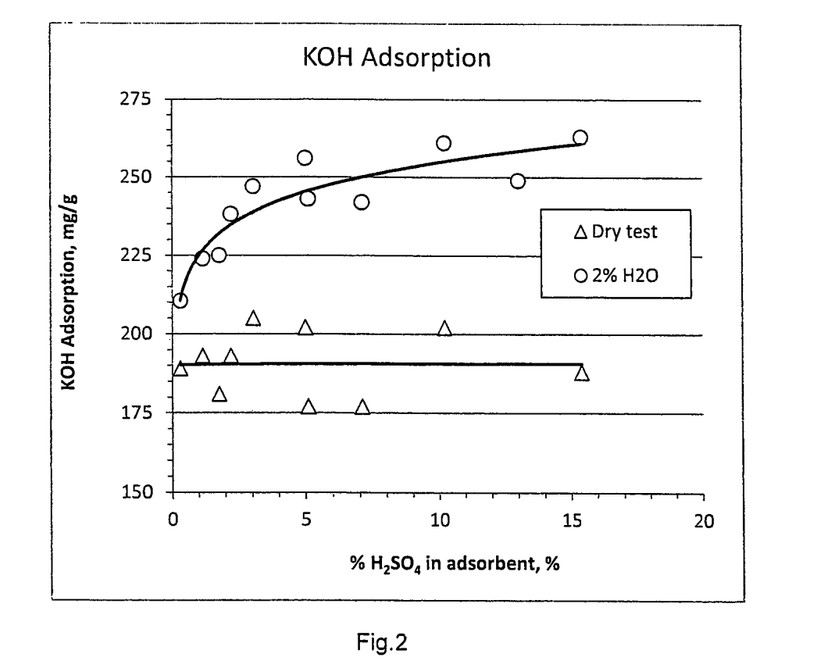
FIG. 2 is a graph showing KOH adsorption capacity (mg/g) of sulfuric acid functionalized magnesium silicate that was employed to treat a crude polyol containing KOH catalyst, either alone or in combination with 2 wt. % water addition.
Figure 3:
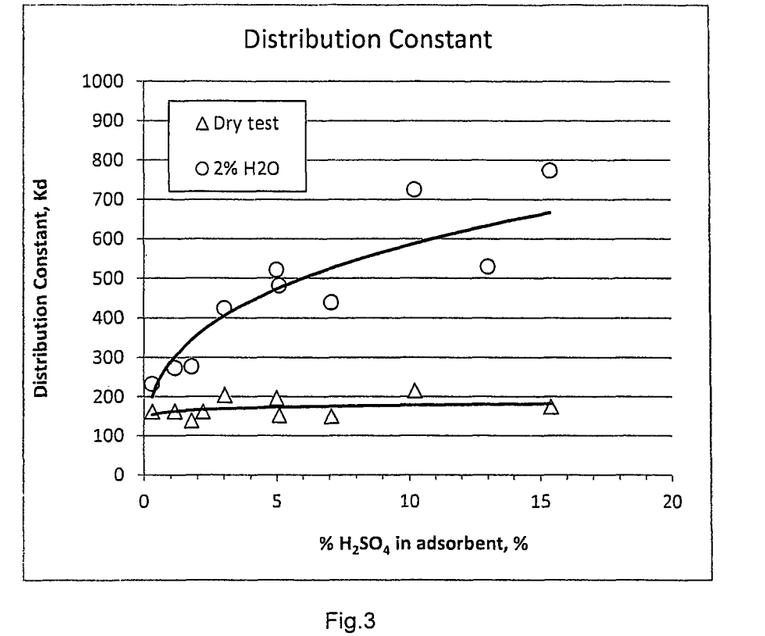
FIG. 3 is a graph showing the distribution constant (Kd) with respect to the concentration of sulfuric acid in a sulfuric acid functionalized magnesium silicate employed, either alone or in combination with 2 wt. % water addition, to treat a crude polyol containing a KOH catalyst.

Data for the residual KOH concentration, KOH adsorption, and Distribution Constant for low molecular weight polyol experiments conducted in dry test (without water addition) and in the modified test with 2% water addition are shown in Table 3 and FIGS. 1 through 3.

TABLE 3

KOH adsorption parameters for sulfuric acid modified samples.
Initial KOH = 3000 ± 50 ppm

| | Dry test (Without water addition) | | | 2% water addition | | |
|---|---|---|---|---|---|---|
| Sample | Residual KOH, ppm | KOH adsorption, mg/g | Distribution Constant, Kd | Residual KOH, ppm | KOH adsorption, mg/g | Distribution Constant, Kd |
| S0 | 1169 | 189 | 162 | 907 | 210 | 232 |
| S1 | 1188 | 193 | 162 | 819 | 224 | 274 |

TABLE 3-continued

KOH adsorption parameters for sulfuric acid modified samples.
Initial KOH = 3000 ± 50 ppm

| | Dry test (Without water addition) | | | 2% water addition | | |
|---|---|---|---|---|---|---|
| Sample | Residual KOH, ppm | KOH adsorption, mg/g | Distribution Constant, Kd | Residual KOH, ppm | KOH adsorption, mg/g | Distribution Constant, Kd |
| S2 | 1193 | 193 | 162 | 813 | 225 | 277 |
| S3 | 1007 | 205 | 204 | 582 | 247 | 424 |
| S4 | 1030 | 202 | 196 | 491 | 256 | 522 |
| S5 | 1180 | 177 | 150 | 550 | 242 | 440 |
| S6 | 940 | 202 | 215 | 360 | 261 | 725 |
| S7 | 1080 | 188 | 174 | 340 | 263 | 774 |

The residual KOH concentrations in the dry test were much higher than in the test with 2% water addition. From FIGS. 1 through 3 it is seen clearly that the performance of magnesium silicate adsorbents functionalized with sulfuric acid up to 15% by weight is better significantly than on unmodified adsorbent. By using an acid functionalized adsorbent it is possible to achieve a much lower residual KOH concentration than on a unmodified adsorbent, especially when 2% water addition is used. For adsorbent S4 with 5% $H_2SO_4$, residual KOH concentration is two times lower than for unmodified S0 adsorbent, while for S6 with 10% $H_2SO_4$, residual KOH concentration is three times lower in the test with 2% water addition.

Figure 4:
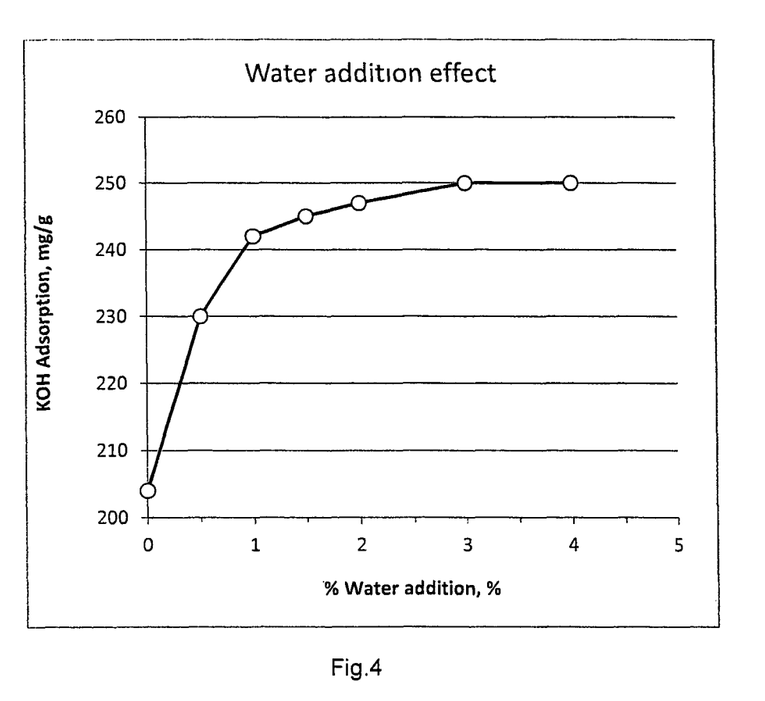
FIG. 4 is a graph showing the effect of water addition on KOH adsorption (mg/g) on a sulfuric acid functionalized magnesium silicate having 4 wt. % sulfuric acid, in treating a crude polyol containing a KOH catalyst.

KOH adsorption is increased for magnesium silicate adsorbents functionalized with sulfuric acid up to 15% by weight, FIG. 2. KOH adsorption is up to 250-260 mg/g when sulfuric acid content is increased up to 15% by weight. It also was found that at a water dose above 4%, KOH adsorptivity reached a maximum, see FIG. 4.

Example 3

Plant Test

Synthetic magnesium silicate was produced by a precipitation reaction between concentrated sodium silicate, 10% wt. magnesium sulfate, and water in a continuous process. The three reagents were dosed in a large reactor where the precipitation reaction took place. The reaction temperature was kept at 45° C., and the pH was 8.5. The slurry was water washed to have a conductance of 3.5 mS/cm and was concentrated. The concentrated slurry then was transferred to the next reactor, where concentrated sulfuric acid was added, and the reaction mixture was agitated intensively to avoid dead zone formation. This slurry was sent to a spray drying machine where it was dried.

The chemical properties of spray dried magnesium silicate samples (S8) and (S9), modified respectively with 3.8% and 5.3% sulfuric acid (Plant test) are shown in Table 4 in comparison with the standard unmodified sample (S0). Mean value particle size (MV) measured by laser diffraction method for the plant sample was around 93 microns. Porosity data for the plant test sample are shown in Table 5.

TABLE 4

Chemical properties of spray dried magnesium silicate modified with sulfuric acid (Plant test)

| Sample | % Acid addition | pH | Conductance, mS/cm | LOI, % | Bulk density g/cc |
|---|---|---|---|---|---|
| S0 | 0 | 9.7 | 0.32 | 13.8 | 0.43 |
| S8 (Plant test) | 3.8 | 8.75 | 0.76 | 12.9 | 0.41 |
| S9 (Plant test) | 5.3 | 8.70 | 1.0 | 13.0 | 0.42 |

TABLE 5

Parameters of porous structure of spray dried magnesium silicate samples modified with sulfuric acid

| Sample | BET Surface Area, m²/g | Total Pore Volume, cc/g | Average Pore diameter, Å |
|---|---|---|---|
| S0 | 265 | 0.506 | 76 |
| S8 (Plant test) | 389 | 0.528 | 54 |
| S9 (Plant test) | 343 | 0.490 | 57 |

The plant samples were tested for KOH adsorptivity according to Example 2. For comparison, two commercially available magnesium silicate samples that were not acid functionalized and are used in the polyol industry for potassium removal were tested under the same conditions. These samples were designated as samples A and B. Data for the unmodified sample (S0) also are included. The data are shown in Table 6 below.

TABLE 6

KOH adsorption parameters for sulfuric acid modified plant samples.
Initial KOH = 3000 ± 50 ppm

| | Dry test (Without water addition) | | | 2% water addition | | |
|---|---|---|---|---|---|---|
| Sample | Residual KOH, ppm | KOH adsorption, mg/g | Distribution Constant, Kd | Residual KOH, ppm | KOH adsorption, mg/g | Distribution Constant, Kd |
| S0 | 1169 | 189 | 162 | 907 | 210 | 232 |
| S8 | 749 | 213 | 284 | 505 | 238 | 471 |
| S9 | 710 | 230 | 324 | 420 | 258 | 614 |
| A | 800 | 215 | 269 | 680 | 227 | 334 |
| B | 970 | 198 | 204 | 790 | 216 | 273 |

The acid functionalized magnesium silicate plant samples with 3.8% and 5.3% sulfuric acid performed better than the unmodified sample and the two commercial products A and B in the dry test, as well as in the test with 2% water addition.

Example 4

Preparation of Magnesium Silicate Adsorbents Modified with Phosphoric Acid

A magnesium silicate concentrated slurry with a solid content of 25% was used for phosphoric acid modification. Magnesium silicate in slurry was prepared by a precipitation reaction and had a mole ratio equal to 2.5 (MR=$SiO_2$/MgO). The slurry was water washed. The initial pH of the concentrated slurry was 9.9 and the conductance was 3.2 mS/cm.

200 g of concentrated slurry were introduced into a stainless vessel and heated at 45° C. under sufficient agitation. 85% $H_3PO_4$ (from 1 to 5% wt. based on the weight of dry sample) then was added directly to slurry and agitated for 15 min. The acid treated slurry was dried at 105° C. in an oven overnight. Then the dried material was milled and found to have a particle size from 53 to 212 urn. Magnesium silicate samples modified with phosphoric acid were designated with the letter P #, where # is the sample example. The unmodified sample (P0) was prepared the same way only without any acid addition. Data on the pH of 5% powder suspension and conductivity are shown in Table 7.

TABLE 7

Chemical properties of oven dried samples modified with phosphoric acid

| Sample | % Acid addition | pH | Conductance, mS/cm | LOI, % |
|---|---|---|---|---|
| P0 | 0 | 9.7 | 0.32 | 13.8 |
| P1 | 1.4 | 9.52 | 0.28 | 11.3 |
| P2 | 2.1 | 9.45 | 0.29 | 10.9 |
| P3 | 2.5 | 9.47 | 0.33 | 11.5 |
| P4 | 3.0 | 9.39 | 0.34 | 11.8 |
| P5 | 5.1 | 9.27 | 0.35 | 11.7 |

Data with respect to BET surface area, total pore volume, and average pore diameter are shown in Table 8 below.

TABLE 8

Parameters of porous structure of oven dried samples modified with phosphoric acid

| Sample | BET Surface Area, $m^2$/g | Total Pore Volume, cc/g | Average Pore diameter, A |
|---|---|---|---|
| P0 | 265 | 0.506 | 76 |
| P2 | 480 | 0.50 | 39 |
| P4 | 469 | 0.47 | 40 |
| P5 | 479 | 0.494 | 41 |

Data on the residual KOH concentration, KOH adsorption and Distribution Constant for low molecular weight polyol experiments conducted in dry test (without water addition) and in modified test with 2% water addition are shown in Table 9

TABLE 9

KOH adsorption parameters for phosphoric acid modified samples. Initial KOH = 3000 ± 50 ppm

| | Dry test (Without water addition) | | | 2% water addition | | |
|---|---|---|---|---|---|---|
| Sample | Residual KOH, ppm | KOH adsorption, mg/g | Distribution Constant, Kd | Residual KOH, ppm | KOH adsorption, mg/g | Distribution Constant, Kd |
| P0 | 1130 | 192 | 170 | 907 | 210 | 232 |
| P1 | 1320 | 180 | 136 | 819 | 224 | 274 |
| P2 | 1370 | 175 | 128 | 761 | 230 | 302 |
| P3 | 1407 | 171 | 122 | 773 | 231 | 299 |
| P4 | 1144 | 191 | 167 | 616 | 244 | 395 |
| P5 | 1060 | 199 | 188 | 723 | 233 | 322 |

The phosphoric acid functionalization of synthetic magnesium silicate improves KOH adsorption significantly and achieves lower residual KOH concentration after treatment of low molecular weight polyols. Atomic adsorption data confirmed that there was no neutralization reaction with phosphoric acid and KOH observed in polyol volume, and, correspondingly, there was no observed crystallization of potassium monophosphate in the reactor volume. The acid modified magnesium silicate separated from the polyol by filtration easily.

Example 5

KOH Removal Efficiency Test

This KOH removal efficiency test was conducted in an apparatus as described in Example 2. The sulfuric acid functionalized magnesium silicate sample S8, containing 3.8 wt. % sulfuric acid as described in Example 3, was used in this test. A commercial crude polypropylene glycol, having a molecular weight of 3,000 and a hydroxyl number of 56, containing 2,300 ppm of KOH catalyst also was used in this test. 200 grams of the polyol was heated to 120° C. under agitation. In order to avoid oxidative degradation of the polyol, a nitrogen blanket was used by purging nitrogen over the polyol during the treatment. After the polyol was heated, 1.5 grams (0.75 wt %) of sample S8 was added to the polyol, followed by addition of 4 grams (2 wt. %) of deionized water. The mixture of polyol, sample S8, and water was heated and agitated for 120 minutes, and then filtered immediately under 25 inches of vacuum into a 5 cm diameter Buchner funnel using a Whatman #1 filter paper. The filtrate was analyzed for residual KOH using the atomic absorption (AA) method.

The above experiment was repeated using 1 wt. % and 1.5 wt. % sample S8 adsorbent. The results are shown in Table 10 below.

TABLE 10

Results of KOH removal efficiency test on the acid functionalized magnesium silicate sample S8. Initial KOH = 2300 ppm.

| Adsorbent Dose, % | Residual KOH, ppm | KOH adsorption, mg/g |
|---|---|---|
| 0.75 | 84 | 309 |
| 1.0 | 6 | 240 |
| 1.5 | <0.1 | 160 |

Example 6

In this example, further comparative data are presented with respect to Sample S0 and Sample S9.

Adsorptivity Test

The potassium hydroxide (KOH) adsorption capacities of the magnesium silicate adsorbents were determined as described in Example 2.

Isotherm of Adsorption

One of the best ways to determine the feasibility of using an adsorbent for a particular application is to determine the adsorption isotherm for the system. In the case of KOH adsorption from polyols, an isotherm is a plot of the amount of KOH adsorbed per unit of adsorbent weight versus the concentration of KOH remaining in polyol (the residual). To collect data for a KOH adsorption isotherm, a set of experiments were conducted according to the description above. The adsorptivity test utilized DPG as the model polyol and adsorbent samples with different weights (usually 0.5; 1.0; 1.5; 2.0; 3.0 and 5.0 grams) were used. The treatment time was 40 minutes at 95° C.

Commercial crude polyols were treated using the same procedure. The type of adsorbent, adsorbent dose %, treatment temperature, and time were varied depending on the objective of the experiment. The initial and residual potassium concentrations in polyol were measured by a titration method using iso-propyl alcohol/DI water solution and by an atomic absorption, or AA method using AAnalyst 200 (PerkinElmer). For AA analysis polyol samples were diluted with isopropyl alcohol (IPA). The pH values of the polyols were determined as the pH of a 5% wt. solution of polyol in 65/30 IPA/water solution. Water content values in the polyols were analyzed by a Karl Fisher (KF) method using DL31 Titrator (Mettler Toledo).

Adsorbent Selection at High and Low Catalyst Concentrations

The isotherm of adsorption is the fundamental characteristic of adsorbent and solution systems, and represents thermodynamic equilibrium between adsorbent (magnesium silicate) and adsorbate (KOH) in solvent (polyol). The isotherms presented are a plot of adsorption in mg of KOH adsorbed per gram of adsorbent plotted on the Y axis as a function of the residual KOH concentration in the DPG on the X-axis. The isotherms of KOH adsorption from DPG on unmodified Sample S0 and Sample S9, modified with 5.3% sulfuric acid, show (FIG. 5A) that KOH adsorption is increased with increasing concentration asymptotically toward saturation. At lower concentrations of catalyst, it becomes more difficult to remove the catalyst.

Figure 5A:
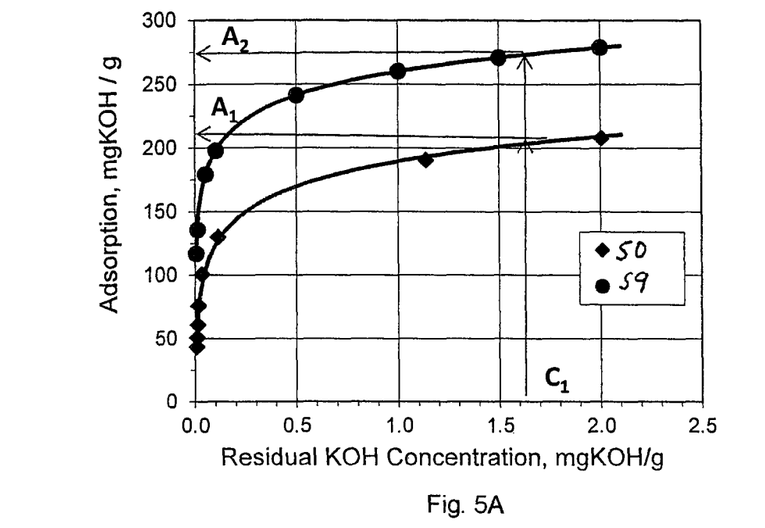
FIGS. 5A and 5B are graphs showing isotherms of KOH adsorption from samples of a dipropylene glycol (DPG) treated for 40 minutes at 95° C. with a non-acid-functionalized magnesium silicate (Sample S0) or an acid-functionalized magnesium silicate treated with 5.3% sulfuric acid (Sample S9)
Figure 5B:
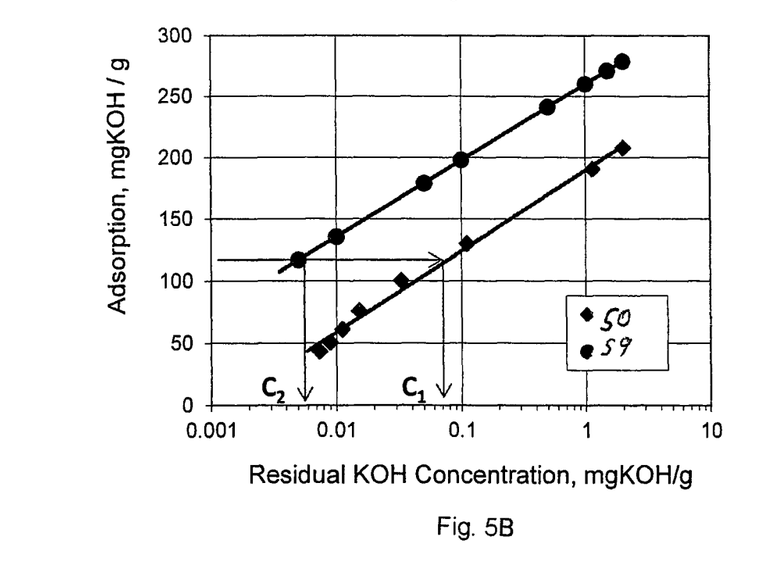

KOH adsorptivity on the acid-functionalized Sample S9 is higher than the adsorptivity on the unmodified Sample S0 in the entire range of KOH concentrations. For example, adsorptivity at equilibrium concentration of $C_1$ (~1.5 mg KOH/g polyol) for adsorbent Sample S9 ($A_2$) is higher than adsorptivity ($A_1$) for Sample S0 which is an industry leader. Therefore, Sample S9 is a more preferred adsorbent from the point of adsorption capacity. The presentations of isotherms on a logarithmic concentration scale (FIG. 5B), allow a more detailed view at lower concentrations. These are the same axes as before with adsorptivity on the Y axis and concentration on the X axis, but with a logarithmic scale, the lower concentration portion of the curve clearly is seen. At the same KOH adsorption (about 120 mg/g), residual KOH concentration achieved with Sample S9 (acid-functionalized with 5.3% sulfuric acid) is much lower, $C_2 \ll C_1$, than on Sample S0, which is highly beneficial for polyol purification.

Figure 6:
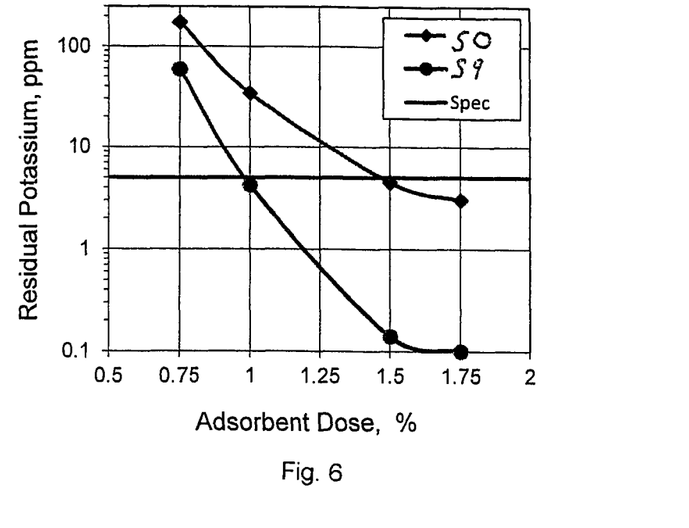
FIG. 6 is a graph showing the effect of the adsorbent dose on the residual potassium content in commercial high molecular weight polyols treated with Sample S0 or Sample S9.

Low residual potassium content in a polyol is achievable with magnesium silicate adsorbents through optimization of processing parameters. Adsorbent type and adsorbent dose are two of the most important factors influencing the residual potassium content for specific polyols. Results of purification of a commercial crude polyol (MW=3000 and hydroxyl number, OH #=56) initially containing 1700 ppm of potassium are presented in FIG. 6. The polyol was treated with different dosages of standard unmodified adsorbent Sample S0 and the sulfuric acid functionalized Sample S9 at 120° C. for 2 hours under laboratory conditions. The potassium specification of 5 ppm is achievable at a 1% dose for the surface modified product Sample S9 while a 1.5% dose is needed for the standard unmodified product Sample S0.

Water Addition

It is known that the addition of water to the polyol-adsorbent suspension prior to heating and filtration promotes and accelerates removal of the catalyst from the crude polyether polyols. (U.S. Pat. Nos. 4,029,879; 4,482,750; and 5,105,019). Alkali metal catalysts, for example, potassium hydroxide, are bound to the polyol molecule after completion of the polymerization reaction. Purification of polyols with higher molecular weights requires higher doses of adsorbent and long treatment times due to the slow diffusion of high molecular weight crude polyols to the adsorbent active sites. (De Lucas, et al., *Chem. Eng. J.*, Vol. 66, pg. 137 (1997).).

Figure 7:
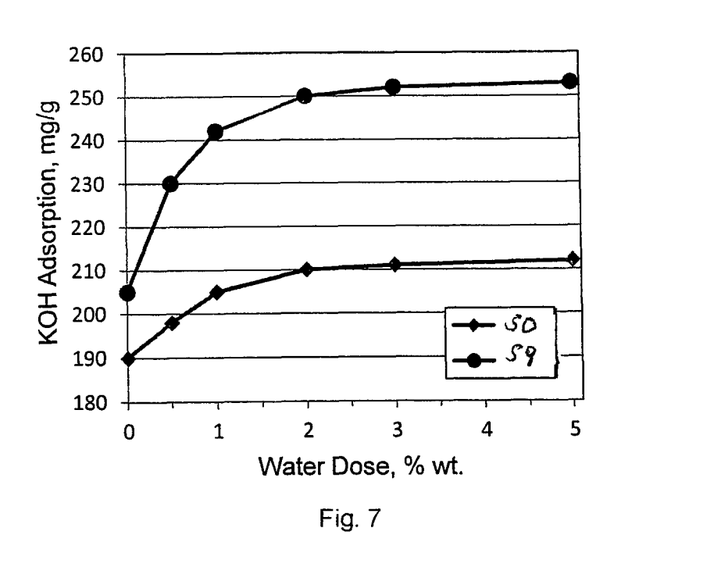
FIG. 7 is a graph showing the effect of water addition on KOH adsorption from samples of DPG treated with Sample S0 or Sample S9.

Water addition enhances potassium transfer from the polyol phase to the water phase. Then potassium is adsorbed easily by magnesium silicate from the water phase:

Water also activates sites on the surface of the adsorbent in the process of polyol purification. A water dose of 0.5% and greater in some polyols can increase the performance of magnesium silicate significantly. Dipropylene glycol containing 3000 ppm of KOH was treated with a 1% dose of the unmodified Sample S0 and the modified Sample S9 adsorbents at different water addition percentages (Water dose) at 95° C. in laboratory conditions. Results collected in FIG. 7 demonstrate that a significant increase in KOH adsorption can be achieved at a water dose of 2 wt % for both adsorbents. The water addition effect was more pronounced for Sample S9 where approximately a 25% improvement was attained for Sample S9, while only 10% improvement was reached for Sample S0. Water dose is limited by the ability of the process to strip excess water from the polyol and the water specification of the final product.

Example 7

Twelve acid functionalized magnesium silicate samples, designated S10 through S21, to which sulfuric acid was added in amounts of from 7.8 wt. % to 62 wt. %, were prepared according to Example 1. Data on the amount of % acid addition, pH of 5% powder suspension, and conductivity are shown in Table 11 below.

TABLE 11

Chemical properties of Samples S10 through S21.

| Sample | % Acid addition | pH | Conductance, mS/cm |
|---|---|---|---|
| S10 | 13 | 8.09 | 2.27 |
| S11 | 7.8 | 8.28 | 1.21 |
| S12 | 15 | 8.36 | 2.0 |
| S13 | 20 | 8.29 | 2.43 |
| S14 | 27 | 8.17 | 2.9 |
| S15 | 30 | 8.15 | 3.03 |
| S16 | 33 | 8.15 | 2.99 |
| S17 | 40 | 7.98 | 3.06 |
| S18 | 42 | 7.86 | 3.53 |
| S19 | 45 | 2.78 | 3.3 |
| S20 | 50 | 2.07 | 4.94 |
| S21 | 62 | 1.75 | 6.54 |

The above results show that acid addition in amounts of 45 wt. % or more results in a significant drop in the pH. This is because the acid present in Samples S19 through S21 is in excess above the stoichiometric amount. This results in conversion of a portion of the magnesium silicate to silica gel ($SiO_2$) and magnesium sulfate ($Mg\ SO_4$).

The conductivity data shown in this example, as well as in Example 1, show that the conductivity is dependent linearly on the percentage of acid addition in amounts up to 15 wt. %. In amounts of from 20 wt. % to 40 wt. %, the dependence of conductivity on the percentage of acid addition shown is a tendency toward saturation, and then the conductivity is increased sharply at acid addition above 45 wt. %.

Samples S10 through S21 were tested for surface area and pore volume as described in Example 1. As shown in Table 2 of Example 1, the BET surface area of Samples S3, S4, and S5, treated with low acid addition (i.e., below 7%) was increased as compared to the unmodified Sample S0. At higher percentages of acid addition, up to 40 wt. %, there was a significant decrease in the BET surface area and total pore volume of the adsorbent. Sample S17 had a surface area of 30 $m^2$/g and a total pore volume of 0.14 cc/g, while Sample S4 had a BET surface area of 453 $in^2$/g and a total pore volume of 0.501 cc/g.

The surface areas and porosities of the adsorbents are increased again at percentages of acid addition of 45 wt. % or more. This may correspond to the loss of chemical stability of the magnesium silicate and the formation of silica gel.

Example 8

The KOH adsorption capacity of Samples S10 through S21 was determined in accordance with the procedure described in Example 2, except that after heating and agitation of the adsorbent/polyol mixture, the mixture was filtered immediately under 30 psi of nitrogen pressure using a Gelman filter with Whatman #1 filter paper. In addition, 2% deionized water was added to the polyol after the adsorbent dosing, also as described in Example 2. The KOH adsorption results are shown in Table 12 below.

TABLE 12

KOH adsorption for Samples S10 through S21.

| Sample | % Acid addition | KOH adsorption, mg/g |
|---|---|---|
| S10 | 13 | 260 |
| S11 | 7.8 | 258 |
| S12 | 15 | 262 |
| S13 | 20 | 249 |
| S14 | 27 | 253 |
| S15 | 30 | 251 |
| S16 | 33 | 247 |
| S17 | 40 | 241 |
| S18 | 42 | 225 |
| S19 | 45 | 227 |
| S20 | 50 | 241 |
| S21 | 62 | 259 |

As shown in Table 3 in Example 2 and in Table 12, the KOH adsorption is increased from 210 mg/g for untreated Sample S0 to 263 mg/g for Sample S7, treated with 15.6 wt. % acid addition. The highest KOH adsorptivity is observed for samples with an acid addition of from about 8 wt. % to about 15 wt. %. At higher percentages of acid addition, the KOH adsorption is decreased gradually, and reached a minimum at 42 wt. % acid addition (Sample S18). After this point, the KOH adsorption is increased again up to 62 wt. % acid addition (Sample S21), but this sample did not filter well, and the filtration time (Data not shown.) increased 10 times in comparison with the other samples.

The disclosures of all patents and publications, including published patent applications, are incorporated herein by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A method of purifying a crude polyalkylene oxide polymer, said crude polyalkylene oxide polymer containing a catalyst, said method comprising:
   contacting said crude polyalkylene oxide polymer with a composition comprising an acid functionalized silicate adsorbent containing at least one acid, wherein said acid functionalized silicate adsorbent is acid functionalized by contacting a silicate adsorbent with at least one polyprotic acid, wherein said crude polyalkylene oxide polymer is contacted with said composition in an amount effective to remove said catalyst from said crude polyalkylene oxide polymer.

2. The method of claim 1 wherein said acid functionalized silicate is an acid functionalized metal silicate.

3. The method of claim 2 wherein said acid functionalized metal silicate is an acid functionalized magnesium silicate.

4. The method of claim 1 wherein said at least one polyprotic acid is selected from the group consisting of $H_2SO_4$, $H_2SO_3$, $H_2S_2O_3$, $H_3PO_4$, $H_4P_2O_7$, $H_2PO_2$, $H_3PO_3$, $H_2CO_3$, and mixtures thereof.

5. The method of claim 4 wherein said at least one polyprotic acid is sulfuric acid.

6. The method of claim 4 wherein said at least one polyprotic acid is phosphoric acid.

7. The method of claim 3 wherein said at least one acid is present in said acid functionalized magnesium silicate in an amount of from about 0.2 wt. % to about 40 wt. %.

8. The method of claim 7 wherein said at least one acid is present in said acid functionalized magnesium silicate in an amount of from about 0.2 wt. % to about 25 wt. %.

9. The method of claim 8 wherein said at least one acid is present in said acid functionalized magnesium silicate in an amount of from about 1 wt. % to about 15 wt. %.

10. The method of claim 3 wherein said acid functionalized magnesium silicate has a molar ratio of MgO to $SiO_2$ of from about 1:1.0 to about 1:4.0.

11. The method of claim 10 wherein said acid functionalized magnesium silicate has a molar ratio of MgO to $SiO_2$ of from about 1:1.4 to about 1:4.0.

12. The method of claim 11 wherein said acid functionalized magnesium silicate has a molar ratio of MgO to $SiO_2$ of from about 1:2.5 to about 1:3.6.

13. The method of claim 3 wherein said acid functionalized magnesium silicate has a pH in a 5% slurry of from about 3.0 to about 10.8.

14. The method of claim 13 wherein said acid functionalized magnesium silicate has a pH in a 5% slurry of from about 7.5 to about 10.5.

15. The method of claim 5 wherein said sulfuric acid functionalized magnesium silicate has a pH in a 5% slurry of from about 8.0 to about 10.5.

16. The method of claim 15 wherein said sulfuric acid functionalized magnesium silicate has a pH in a 5% slurry of from about 8.0 to about 9.7, and a molar ratio of MgO to $SiO_2$ of from about 2.5 to about 2.8.

17. The method of claim 15 wherein said sulfuric acid functionalized magnesium silicate has a pH in a 5% slurry of from about 8.0 to about 10.5, and a molar ratio of MgO to $SiO_2$ of from about 3.2 to about 3.6.

18. The method of claim 3 wherein said acid functionalized magnesium silicate has a has a conductance in a 1.0% slurry of from about 0.2 mS/cm to about 5.0 mS/cm.

19. The method of claim 5 wherein said sulfuric acid functionalized magnesium silicate has a conductance in a 1.0% slurry of from about 0.2 mS/cm to about 2.6 mS/cm.

20. The method of claim 6 wherein said phosphoric acid functionalized magnesium silicate has a conductance in a 1.0% slurry of from about 0.2 mS/cm to about 1.5 mS/cm.

21. The method of claim 3 wherein said acid functionalized magnesium silicate has a loss on ignition of from about 10.0% to about 15.0%.

22. The method of claim 3 wherein said acid functionalized magnesium silicate has a surface area of at least 30 square meters per gram.

23. The method of claim 22 wherein said acid functionalized magnesium silicate has a surface area of at least 50 square meters per gram.

24. The method of claim 23 wherein said acid functionalized magnesium silicate has a surface area of from about 50 square meters per gram to about 700 square meters per gram.

25. The method of claim 3 wherein said acid functionalized magnesium silicate has a total pore volume of at least 0.1 ml per gram.

26. The method of claim 25 wherein said acid functionalized magnesium silicate has a total pore volume of from about 0.1 ml per gram to about 1.2 ml per gram.

27. The method of claim 3 wherein said acid functionalized magnesium silicate has a mean particle size of from about 10 microns to about 1,000 microns.

28. The method of claim 27 wherein said acid functionalized magnesium silicate has a mean particle size of from about 10 microns to about 500 microns.

29. The method of claim 28 wherein said acid functionalized magnesium silicate has a mean particle size of from about 10 microns to about 250 microns.

30. The method of claim 29 wherein said acid functionalized magnesium silicate has a mean particle size of from about 10 microns to about 175 microns.

31. The method of claim 30 wherein said acid functionalized magnesium silicate has a mean particle size of from about 10 microns to about 125 microns.

32. The method of claim 31 wherein said acid functionalized magnesium silicate has a mean particle size of from about 30 microns to about 100 microns.

33. The method of claim 3 wherein said acid functionalized magnesium silicate has a bulk density of from about 0.2 g/cc to about 0.8 g/cc.

34. The method of claim 3 wherein said crude polyalkylene oxide polymer is contacted with said acid functionalized magnesium silicate in an amount of from about 0.1 wt. % to about 3.0 wt. %, based on the weight of said crude polyalkylene oxide polymer.

35. The method of claim 34 wherein said crude polyalkylene oxide polymer is contacted with said acid functionalized magnesium silicate in an amount of from about 0.5 wt. % to about 3.0 wt. %, based on the weight of said crude polyalkylene oxide polymer.

36. The method of claim 3 wherein said catalyst is an alkali catalyst.

37. The method of claim 36 wherein said alkali catalyst is potassium hydroxide.

38. The method of claim 3, and further comprising:
contacting said crude polyalkylene oxide polymer with a liquid comprising water subsequent to contacting said crude polyalkylene oxide polymer with said acid functionalized magnesium silicate.

39. The method of claim 38 wherein said crude polyalkylene oxide polymer is contacted with said liquid comprising water in an amount of from about 0.5 wt. % to about 4.0 wt. %, based on the weight of said crude polyalkylene oxide polymer.

40. The method of claim 38 wherein said liquid comprising water further comprises at least one alcohol.

41. The method of claim 40 wherein said at least one alcohol is selected from the group consisting of methanol, ethanol, propanol, isopropanol, and mixtures thereof.

42. The method of claim 3, and further comprising:
contacting said crude polyalkylene oxide polymer with at least one alcohol subsequent to contacting said crude polyalkylene oxide polymer with said acid functionalized magnesium silicate.

43. The method of claim 42 wherein said at least one alcohol is selected from the group consisting of methanol, ethanol, propanol, isopropanol, and mixtures thereof.

44. The method of claim 42 wherein said crude polyalkylene oxide polymer is contacted with said at least one alcohol in an amount of from about 0.5 wt. % to about 4.0 wt. %, based on the weight of said crude polyalkylene oxide polymer.

45. The method of claim 1 wherein said crude polyalkylene oxide polymer is a polyether monol.

46. The method of claim 1 wherein said crude polyalkylene oxide polymer is a polyether polyol.

47. The method of claim 2 wherein said acid functionalized metal silicate is acid functionalized calcium silicate.

* * * * *